US006870136B1

(12) United States Patent
Majordy (10) Patent No.: US 6,870,136 B1
(45) Date of Patent: Mar. 22, 2005

(54) PROOFING CABINET (75) Inventor: Moe H. Majordy, Parsons, TN (US)

(73) Assignee: Manitowoc Foodservice Companies, Inc., Sparks, NV (US)

( * ) Notice: Subject to any disclaimer, the term of this patent is extended or adjusted under 35 U.S.C. 154(b) by 4 days.

(21) Appl. No.: 10/357,856

(22) Filed: Feb. 3, 2003

(51) Int. Cl.$^7$ .............................. A21B 1/26; F27D 7/04
(52) U.S. Cl. ........................................ 219/400; 99/476
(58) Field of Search ................................ 219/386, 400, 219/401, 394, 385; 99/474–476, 483, 480, 481

(56) References Cited

U.S. PATENT DOCUMENTS

| 1,943,575 A | * | 1/1934 | Abendroth ............... 219/386 |
| 2,396,455 A | | 3/1946 | Booth |
| 3,595,178 A | | 7/1971 | Dahlen |
| 3,861,378 A | | 1/1975 | Rhoads et al. |
| 3,895,215 A | | 7/1975 | Gordon |
| 3,905,760 A | | 9/1975 | Johansson et al. |
| 3,908,749 A | * | 9/1975 | Williams ................ 219/386 |
| 4,010,349 A | | 3/1977 | Lee |
| 4,030,476 A | | 6/1977 | Hock |
| 4,039,278 A | | 8/1977 | Denholm |
| 4,515,143 A | | 5/1985 | Jabas |
| 4,549,072 A | | 10/1985 | Brist et al. |
| 4,779,604 A | | 10/1988 | König |
| 4,892,083 A | | 1/1990 | König |
| 4,984,557 A | | 1/1991 | König |
| 5,228,385 A | | 7/1993 | Friedrich et al. |
| 5,463,940 A | | 11/1995 | Cataldo |
| 6,054,686 A | | 4/2000 | Pauly et al. |
| 6,393,969 B1 | * | 5/2002 | Kim ........................ 219/400 |
| 6,465,762 B1 | | 10/2002 | Swayne et al. |

* cited by examiner

Primary Examiner—Joseph Pelham
(74) Attorney, Agent, or Firm—Brinks Hofer Gilson & Lione (57) ABSTRACT A proofing cabinet with an insulated proofing chamber having at least top and bottom proofing zones. The cabinet has uniformly controlled temperature in one or more proofing zones within the chamber, allowing dough within the chamber to rise the proper amount and ensuring that the resulting bread or bread product will be neither too flat nor too airy. The cabinet is useful for proofing a large quantity of items at a single time. The cabinet may also be used to hold foods at a specified temperature.

42 Claims, 5 Drawing Sheets

PROOFING CABINET

FIELD OF THE INVENTION

This invention relates to insulated, heated cabinets for proofing dough for baked goods, or for making yogurt, pharmaceutical products, biological cultures, and other products. The general field is that of forced convection proofing cabinets or boxes.

BACKGROUND OF THE INVENTION

Baked goods and products using baked goods are a staple in the diets of Americans and many other peoples. Breads in particular, and foods that consist in large part of bread, make up a large portion of this market. Examples include hamburgers with a hamburger bun, frankfurters with a frankfurter bun, and pizzas with a bread bottom or crust. Such foods are baked daily by many bakeries and are sold in supermarkets and other retail outlets millions of times every day. Foods with a baked good portion may also be prepared for consumption on the premises at hotels, restaurants, shopping center food courts, and the like.

Different problems may be encountered with the preparation of baked goods and breads at these different locations. In a bakery, preparing many loaves of bread or buns for resale to retailers, there is no customer in the next room waiting for his order, but there is time pressure to bake the goods, wrap them, and ship them to stores or other outlets. In a hotel or a restaurant, smaller amounts of food are prepared. However, once the customer has placed his or her order, there is considerable pressure to prepare the food and serve it. An example may be a pizza. Unlike a loaf of bread or a hamburger bun, a pizza is generally not prepared in advance of the customer's order. Therefore, when a customer at a hotel or a restaurant orders a pizza, the restaurant or hotel is under considerable time pressure to bake and serve the pizza.

It follows that the restaurant or hotel is very interested in assuring that the pizza will be timely prepared. The most difficult part, and perhaps the most important part, of pizza preparation is the bread or crust. There may be as many different types of crusts as there are toppings of pizza, but the crusts all have one thing at least in common: all are made from bread, all the breads contain yeast, and all the crusts are prepared in advance. The pizza will only be as good as the bread from which it is made.

In general, dough is prepared in a bakery from a mixture of ingredients and allowed to rise. Later, the dough may be cut into portions, shaped for use as a pizza crust or other bread product, packaged, and refrigerated or frozen for storage and shipment. In order to make a good pizza, the dough must meet certain standards. The dough must rise a certain amount in order to have an appealing texture, consistency, density, taste, and feel ("mouth"). The pizza or other product made from the bread will not be appealing if the dough does not rise within certain limits. Proofing cabinets are used to properly proof the dough, which means holding the dough at a certain temperature for a period of time in order to allow the dough to rise before baking or cooking. Pizza crusts or other baked goods that do not rise within specified limits may be judged out of tolerance and discarded or made into "seconds," rather than sold as premium-quality food products.

A proofing cabinet may also be known as a proofing box or a proofing oven. A proofing oven will generally be capable of proofing a bread product, and may also have sufficient heating capability to fully cook the product. One such proofing oven is described in U.S. Pat. No. 5,463,940, in which air is recycled from the oven to a dehumidifier outside the oven, heated, adjusted for a humidity level, and then blown back into the oven with a fan. This oven uses baffles or deflectors to insure turbulent air flow throughout the oven. However, the temperature throughout the oven is not uniform, and dough in different areas of the oven will be "proofed" at different temperatures. Therefore, results will depend on the location within the oven of each piece of dough. This is unsatisfactory. Another proofing oven and method is described in U.S. Pat. No. 6,456,762. This "proofing" oven uses sophisticated microprocessor controls in a conventional kitchen stove that incorporates a fan for better circulation and temperature uniformity. However, this arrangement may only provide a small region in the center of the oven that has sufficient temperature uniformity for satisfactory proofing.

What is needed is a proofing cabinet that has better uniformity of temperature throughout the cabinet, and wherein the cabinet is sufficiently large that a plurality of goods may be proofed at once.

BRIEF SUMMARY

One aspect of the invention is a proofing cabinet. The proofing cabinet comprises an insulated proofing chamber having at least top and bottom proofing zones, each proofing zone comprising a horizontally defined region. The proofing cabinet also comprises an air supply panel on at least two sides of the chamber having openings and a total opening area for each of the proofing zones for distributing air from an air supply duct to each of the at least top and bottom proofing zones, and a fan and a heater receiving air from the proofing chamber and heating and recycling the air through the supply duct and the supply panels, wherein the total opening area varies between the at least top and bottom proofing zones so that each of the at least top and bottom proofing zones may be maintained at substantially the same temperature during operation.

Another aspect of the invention is a method of configuring a proofing cabinet. The method comprises heating air and blowing air to a supply duct and a supply panel with openings on at least two sides of a proofing chamber, and dividing a flow of the air into at least a top and a bottom proofing zone by forcing the air through openings in the supply panel, wherein a total opening area supplying said air to said top and bottom proofing zones differs between the top and bottom proofing zones. The method also comprises measuring a temperature in each of the at least top and bottom proofing zones and adjusting the total opening area until the temperature is substantially the same in each of the at least top and bottom proofing zones.

Another aspect of the invention is a method of proofing a product. The method comprises placing the product into a proofing cabinet according to the description above, and setting a desired temperature for the cabinet. The method also comprises waiting for a period of time while the product is at the temperature.

Another aspect of the invention is a proofing cabinet. The proofing cabinet comprises an insulated proofing chamber and an air supply panel on at least two sides of the chamber having openings for distributing air from an air supply duct to the chamber. The proofing cabinet also comprises a fan and a heater receiving air from the proofing chamber and heating and recycling the air through the supply duct and the supply panel, wherein the openings are sized and placed so that a temperature of the chamber may be maintained substantially the same throughout the chamber. These and many other aspects of the invention will be best understood in view of the attached description and drawings.

DETAILED DESCRIPTION OF THE DRAWINGS AND THE PRESENTLY PREFERRED EMBODIMENTS

Bread dough is made by mixing yeast, sugar, flour, liquids and salt in proper proportions to form dough. The mixture is repeatedly kneaded and then allowed to rise for a specific period of time. This period is called proofing. During proofing, the yeast is growing and fermenting while consuming the sugar that has been added. The yeast emits carbon dioxide and water, which bubbles through the dough and cause it to rise. Proofing often takes an extended period of time, and the dough should not be left unrefrigerated after the proofing period. Therefore, proofing may be conducted in a heated environment, allowing the yeast to ferment and the dough to rise, but not cooking the dough. This proofing may conveniently take place at temperatures from about 95° F. (35° C.) to about 120° F. (49° C.). During the proofing period, the dough rises and a bread maker can determine whether the dough has risen the desired amount.

Figure 1:
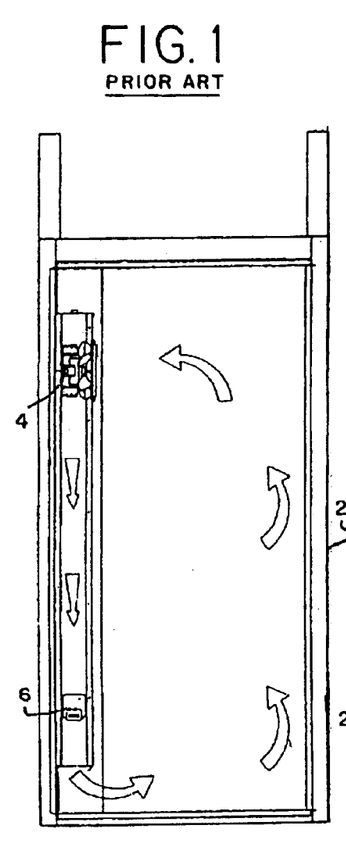
FIG. 1 is a schematic view of a prior art proofing cabinet.

During this process, a measured amount of dough is typically placed in a bread pan or other container. The container, or a plurality of containers, is then placed in a heated environment, such as a proofing cabinet, for a specific time at a uniform temperature. The rise of the dough is then measured or evaluated, and a decision is made as to whether the dough has risen enough to be baked. One such standard proofing cabinet is depicted in FIG. 1. A proofing cabinet 2 may include a fan 4 and a heater 6. The dough to be proofed is placed on racks inside the proofing cabinet. As depicted by the arrows in FIG. 1, the air circulation in a standard proofing oven or cabinet may not be conducive to an even, uniform temperature in all regions of the chamber because the heated air is not evenly distributed throughout the chamber. In this example, the bottom of the chamber, first receiving air from the fan and the heater, may be warmer than the top of the chamber. Thus, different portions of the chamber may have different temperatures. A plurality of dough products, placed in a plurality of locations within the chamber, may be proofed at different temperatures, resulting in differences in the rise of the dough. This is problematical for the baker, because not all the products are ready to be placed in the oven at the same time, and the baker does not want to continually re-open an oven to add more product.

Figure 2:
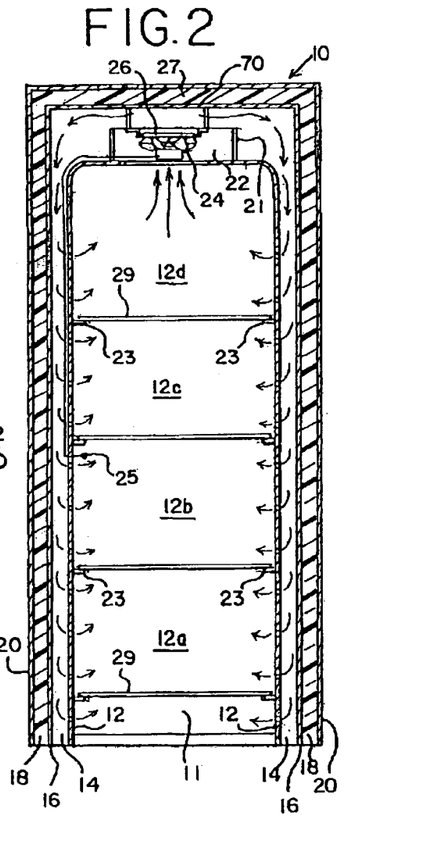
FIG. 2 is a cross sectional view of a proofing cabinet of the present invention.

An improved proofing cabinet with a plurality of proofing zones for a plurality of dough products would allow a baker to proof many loaves or pizza crusts at once with a better chance of having the desired proofing conditions. Having a proofing cabinet with better temperature uniformity would result in better quality baked goods or pizza crusts. Such a cabinet is depicted in FIG. 2. A proofing cabinet 10 has an inner chamber 11 with a plurality of proofing zones 12a, 12b, 12c, 12d. As shown in FIG. 2, each proofing zone is a horizontally defined region within the proofing chamber. The chamber is formed on the left and right sides by a supply panel 12 that borders an air supply duct 14. The duct is completed on its far side by an outer panel 16 and a layer of insulation 18, followed by an outside sheet metal enclosure 20. The insulation is preferably pressure-injected polyurethane foam with closed cells. In a reach-in version, the chamber is equipped with racks 23 on the sides in order to support shelves 29. In a roll-in version of the proofing cabinet, the racks and shelves may be on a cart that is rolled into the cabinet.

The proofing cabinet 10 has a return duct panel 21 and return duct 22 atop the chamber 11, with a fan 24 and heater 26 for circulating and heating the air. Heated air is returned downward by a heat shield 70. The top of the chamber may have insulation 27 atop the heat shield 70, or the heat shield may instead be fastened to a sheet metal top with insulation outside of the sheet metal. As indicated by the arrows, air flows upwards through chamber 11, through return duct panel 21 and return duct 22, into fan 24 and heater 26, and then down supply duct 14. Thermocouple 25 signals a temperature in the chamber to a controller. The heated air flows evenly through openings in supply panels 12 on both sides of chamber 11. Not shown in the figure is a back side which should be closed and insulated. There is also a door on the front side, generally hinged and forming a tight seal with the sides, top and bottom of the front entrance to the proofing cabinet. The floor or bottom of the cabinet is also enclosed and insulated, as is the top of the proofing cabinet. The cabinet preferably has a short ramp on the floor so that carts on casters or wheels may be rolled into the cabinet (a "roll-in" model cart proofing cabinet). Reach-in cabinets may also be made, in which there are shelves 23 and racks 29 in the cabinet for placing dough or other products for proofing. Alternately, the box or cabinet may be fitted with a rotating carousel to slowly rotate the product horizontally while being proofed. In a preferred embodiment, the usable depth of the cabinet is at least 30 inches (about 76 cm), the width is at least about 19 inches (about 48 cm), and the height is at least about 58 inches (about 147 cm).

Figure 3:
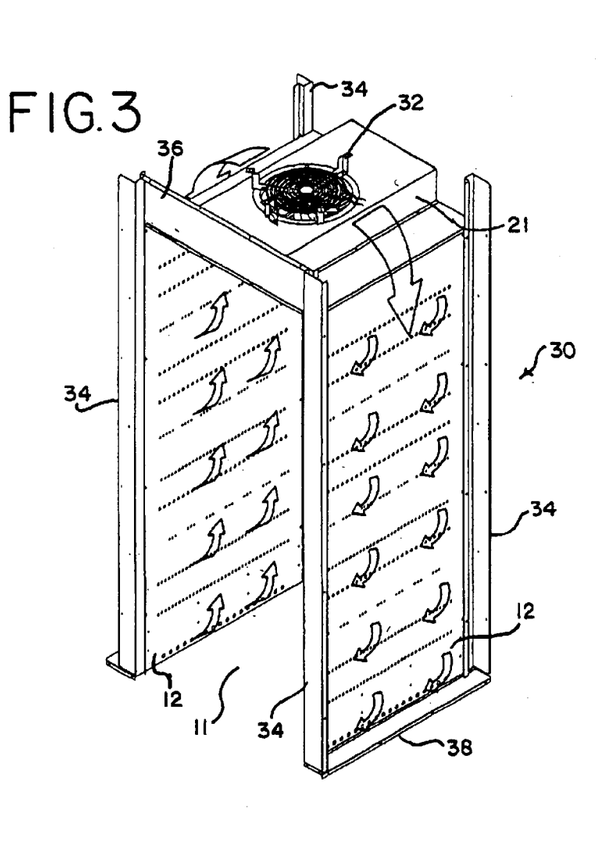
FIG. 3 is a perspective view of the internal structure of FIG. 2 depicting the air flow pattern achieved in the embodiment of FIG. 2.

A perspective view of the cabinet 30 is shown in FIG. 3, with the outer panels and insulation removed. Central proofing chamber 11 funnels return air upwards through the return duct panel 21 to the fan and heater assembly 32, as shown by the upward-pointed arrows within chamber 11. The air is then returned downward through supply ducts 14 (see FIG. 2) and through the supply panels 12, as shown by the downward-pointing arrows. The cabinet may include front and back mounting rails 34 and top cover panel 36. Supply panels 12 include a plurality of openings in horizontal rows, allowing and controlling the flow of air to the proofing chamber 11 and also controlling the distribution of the air to portions of chamber 11.

Figure 4:
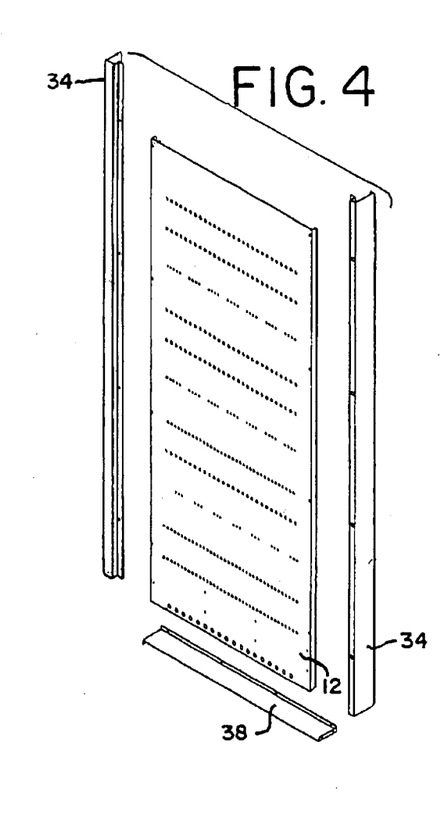
FIG. 4 is an exploded view of a supply panel for the embodiment of FIG. 2.

A closer view of an embodiment of a supply panel 12 is depicted in FIG. 4, along with front and back mounting rails 34 and bottom rail 38. The panel and the rails are made of bent sheet metal. The panels are used on both the left side and the right side of the cabinet. The panel has several rows of openings that are used to balance the convective heat transfer among the proofing zones in the proofing cabinet. The panel depicted in FIG. 4 is suitable for a proofing cabinet having 4 vertical zones. The amount of air transferred by each opening, or each row of openings, depends on the laws of fluid mechanics. In this case, for heated air at a relatively low pressure, the principal determinants of airflow through a row of openings include the pressure difference across the orifices or openings, the size and shape of the openings, and the number of openings. Test panels were tried, tested and changed many times before deciding on the configuration described below. The total opening area for each panel or proofing zone is the total area of the individual openings. Ideally, the total opening area is the same for each inlet panel. The total opening area on each side of each proofing zone is also desirably the same.

This panel creates four horizontally-defined proofing zones by having top two rows of ⅜ inch diameter openings on ¾-inch centers for a top proofing zone, followed by a third row having fewer and smaller, ¼-inch openings. The ¼-inch openings are on about ½-inch centers, and are arranged in groups of three or four openings, the groups separated by about 1½ inches. The first row of ⅜-inch openings is about 7 inches vertically from the top of the panel. The two rows of ⅜-inch openings are separated vertically by about 4 inches, and the row of ¼-inch openings is placed at about 5 inches lower vertically. After a vertical space of about 6 inches, there are two more rows of ⅜ inch openings also on ¾-inch centers, creating a second proofing zone. These two rows are separated by about four inches vertically. After a vertical space of about five inches, there is another row with a smaller number of ¼-inch openings. After a vertical space of about five inches, a third proofing zone is created with two more rows of larger openings, one row of 5/16-inch openings on 9/16-center separations and one row of ⅜-inch openings on ¾-inch center separations. These two rows are separated by about 4 inches vertically. A row having a smaller number of ¼-inch openings then follows, separated vertically by about five inches from the row of ⅜-inch openings above and from the following row of 5/16-inch openings below. The fourth and final proofing zone is created toward the bottom of the proofing chamber by two rows of 5/16-inch openings, followed by a bottom row of ½-inch openings. The row of ½-inch openings is close to the bottom of the panel, and may be spaced about 1 inch from the very bottom. The bottom row of 5/16-inch openings is separated vertically from the top row by about five inches and is separated from the bottom row of ½-inch openings by about 6 inches. The ½-inch openings are on about 1⅛-inch centers. All openings for heating purposes are in about the horizontally-centered 19 inches of the panel.

In a preferred embodiment, the sheet metal is 22 ga (about 0.030 inches thick, about 0.76 mm), and is about 63 inches high (161 cm) and about 26 inches wide (67 cm). The above-described arrangement of openings yields four proofing zones in the chamber. With these openings used in both the left and right side supply panels, there is a top zone, two middle zones, and a bottom zone. The temperature of each zone is preferably within 5 degrees F. (3 degrees C.) or less of the temperature in each of the other zones.

These openings and their arrangements were determined by experimentation. A standard rack, such as those made by Metro, model number PHDC2130A, with four product zones was used with an experimental proofing cabinet as shown in FIGS. 2–4. Pizza pans with 12" pizza crusts were stacked five high and two deep (front and back) with thermocouples attached to each stack of five. The thermocouples may be placed, for instance, on the top, middle, and bottom pan in each group of five pizza pans. The holes or openings were adjusted until the thermocouples read within a few degrees, or one degree, of each other, for all the thermocouples in the proofing cabinet. For four stacks of pizza crusts, three thermocouples per stack, there were twelve thermocouples. If eight stacks of five pans each are used, two stacks in each zone, three thermocouples per stack, a total of twenty-four thermocouples may be used. More thermocouples or fewer may also be used. These loads and techniques may be useful in designing the supply panels for use in the proofing cabinet. Other temperature-determining devices may also be used, such as resistance-temperature detectors (RTDs).

It is best to conduct these tests in a proofing cabinet with dimensions close to a production model and with the bread product and bread pan (or pizza pan) that will be used to proof the dough. With the actual use configuration, the air flow and thus the heat transfer from the heated, forced air will closely mimic the proofing chamber performance in production situations. Using the thermocouples and the proofing performance, in conjunction with a basic knowledge of fluid dynamics and the symmetry in the proofing chamber, the openings are adjusted until the thermocouple readings are within the desired degree of uniformity.

The openings may be adjusted in two ways to adjust the total opening area in the supply panels. In one way of adjusting, the number of openings and the size of the openings may be increased by cutting new openings of the desired size into the supply panels. The number or size of the openings may be decreased by blocking, partially blocking, closing, or partially closing a number of the openings.

Tests may then be conducted with dough or other bread product to assure performance with the desired product. Mastic gum may be used for dummy loads for test purposes. One such product is RV3012-4 Thumbgrade Mastic, made by Adco Products, Inc., Michigan Center, Mich. In subsequent tests with actual dough, 100% proofing was achieved with 40 pizza crusts, using 1800 watts and a 70 minute proofing time at 95° F. A frozen 12" pizza crust was put into each pan. The pan had two markings for the minimum and maximum rise allowed. In other tests, 100% successful proofing was achieved with 80 pizza crusts in 80 minutes at 95° F. In these tests, 100% proofing performance was achieved when there was substantial uniformity of thermocouple readings throughout the proofing chamber. Substantial uniformity means that all thermocouples were within 5 degrees of one another, e.g., all thermocouples reading 92 to 97° F. By success is meant that the pizza crust, or other dough or bread product, rises sufficiently to touch the bottom line of rising performance in a pizza pan, but does not rise so much that the dough exceeds the top limit of the pan. Success with other foods or other products may be measured in different ways.

In this embodiment, there are four vertical proofing zones in the proofing chamber. If the proofing chamber is sufficiently deep or wide, there may be two horizontal zones, left-right or front-back. Other embodiments are also possible, such as two vertical zones or three vertical zones, or more than four vertical zones. The openings may be determined experimentally by using thermocouples or other temperature gauging or reading elements. The entire chamber may also be considered as a single "proofing zone," if the temperature everywhere within the chamber is within certain desired limits. This may be achieved, for instance, by adding additional openings to the rows of ¼-inch openings, or by enlarging the openings as needed. Thus, rather than having multiple zones or a plurality of zones, the proofing cabinet or box may comprise a single zone in its entirety.

Figure 5:
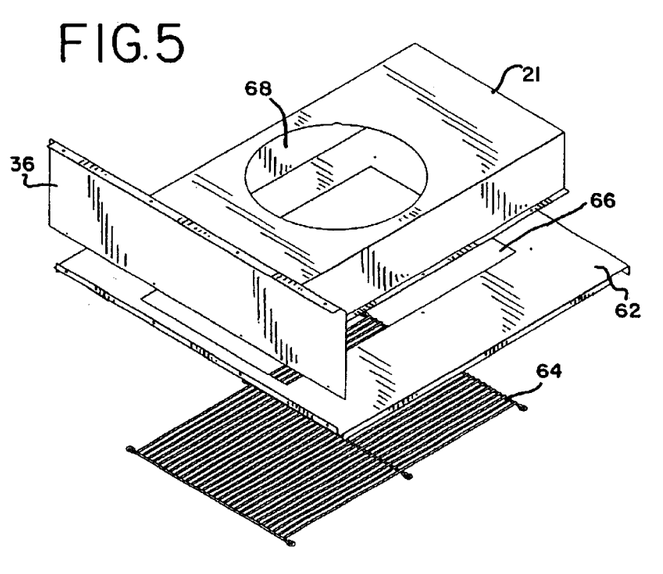
FIG. 5 is an exploded view of a return duct assembly used in the embodiment of FIG. 2.
Figure 6:
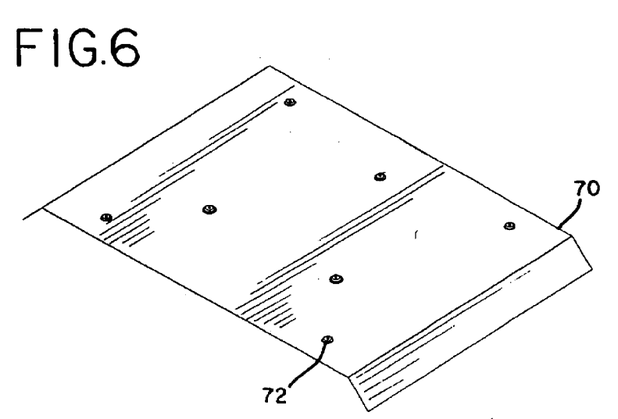
FIG. 6 is a perspective view of a heat shield for the embodiment of FIG. 2.

In addition to the proofing chamber and the supply ducts and supply panels described above, the proofing cabinet has other components that enable the rapid and efficient transport of heated air through out the cabinet. FIG. 5 depicts the return air duct assembly at the top of the chamber. The components include a top duct panel 62, which is generally positioned atop the proofing chamber. A fan guard 64 may also be placed below top duct panel 62, or may also be placed above top duct panel 62. Return air separator 21 has an open bottom and a top orifice 68 to allow passage of air from the fan and heater. The fan and heater may be contained between top duct panel 62 and return air separator 21. A front top panel 36 is also used to contain and direct air flow. FIG. 6 depicts a heat shield 70, preferably installed atop return air separator 21. The heat shield helps to retain heat from the heated air and protect the outer portion of the proofing cabinet from hot air generated by the heater and fan depicted in FIG. 7. There may be insulation on top of the heat shield. Heat shield 70 may have dimples 72 to provide a protective air gap between the heat shield and the outer skin or sheet metal of the proofing cabinet. In FIG. 6, four dimples 72 are spaced at corners of heat shield 70, the four dimples may also be perforated for fastening to the top of the proofing cabinet. There are three dimples 72 in a triangle pattern in the central portion of the heat shield. The three dimples may also be perforated for fasteners, to support the heater and fan depicted in FIG. 7.

Figure 7:
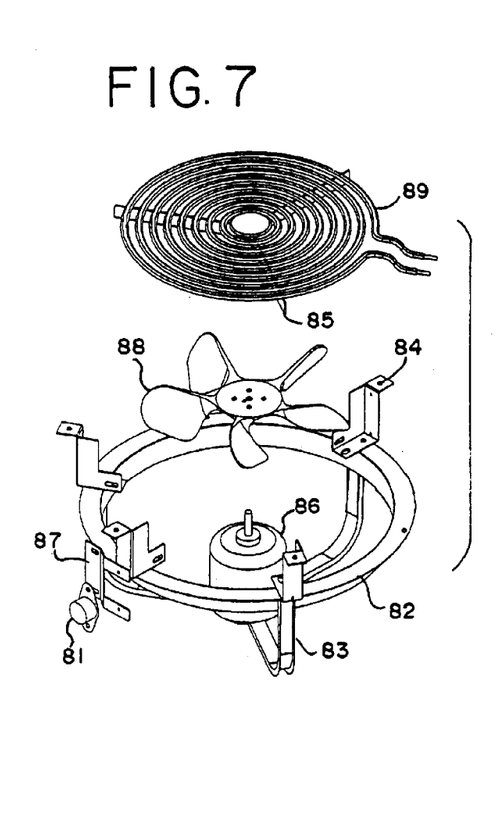
FIG. 7 is an exploded perspective view of a heater and fan assembly useful for the embodiment of FIG. 2.

The heater and fan assembly 80 depicted in FIG. 7 are important in providing a source of heat and motive power for the forced, heated convection of the proofing box. In this embodiment, the assembly includes a fan shroud ring 82, three fan motor support brackets 83, and three assembly mounting brackets 84, for mounting to the three central dimples of the heat shield as described above. The assembly may include a high limit temperature safety device 81 mounted via a mounting bracket 87 to fan shroud ring 82. The assembly includes a fan blade 88 mounted to fan motor 86, and a heater 89 mounted on three heat mounts 85 that insulate heater 89 both electrically and thermally from the other elements of the assembly. Heater 89 is preferably a calrod heating element in a circular configuration for efficiency in blowing air across the heating element and transferring the maximum amount of heat with minimal resistance to air flow.

Figure 8:
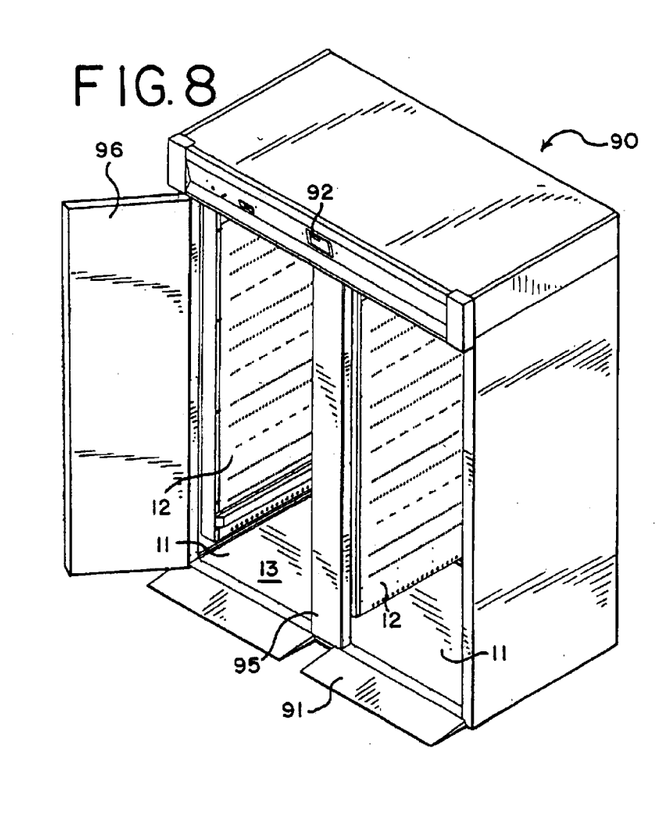
FIG. 8 is a perspective view of a second embodiment of a proofing cabinet of the present invention with two proofing chambers.

The embodiments discussed above with respect to FIGS. 2–7 may not be sufficiently large for a high-volume restaurant or pizza restaurant. Other embodiments may therefore use more than one chamber, such as the dual chamber embodiment depicted in FIG. 8. FIG. 8 depicts a heated holding and proofing box or cabinet having two separate, insulated chambers. Two-section holding box 90 includes two separate, insulated chambers 11. Each chamber 11 has two supply panels 12, on the left and right sides of the chamber respectively. FIG. 8 also depicts a ramp 91 for use for roll-in carts containing pizza crusts or other dough for baked goods. Each chamber 11 also has a bottom or floor 13 that is also insulated, preferably by at least one or two inches of insulation, such as pressure-injected polyurethane foam, but other insulation may also be used.

Whether the proofing cabinet is a single-chamber model or a dual-chamber model, it may be controlled by a controller 92, preferably a microprocessor controller. The controller is in operable communication with temperature sensing devices and the heater and the fan motor to control the temperature within the cabinet. In a dual-chamber proofer, there will be a separate heater and fan for each proofing chamber, but there is typically only one controller and both chambers are maintained at the same temperature. Other control schemes, including schemes using multiple controllers, may also be used. Temperature sensing devices may be thermocouples 83 as shown, or other temperature sensing devices as desired. With a microprocessor controller using control, such as a proportional-integral-differential (PID) routine, and one or more temperature sensing devices, such as thermocouples or RTDs, the temperature may be held as closely as 1° F. at all locations within the cabinet. If a thermostat with a temperature-sensing device is used in place of a microprocessor, with on/off control, the temperature may still be controlled within the proofing cabinet, but may be within limits of about 5° F. (3° C.) rather than the tighter range allowed by modulating control. The chambers are separated by the panels and insulation as used on the left or right sides of a single chamber, and may be covered with an attractive front center panel 95. Of course, there is a door 96 for each chamber (only one door shown in FIG. 8), whether a dual or single chamber model.

Figure 9:
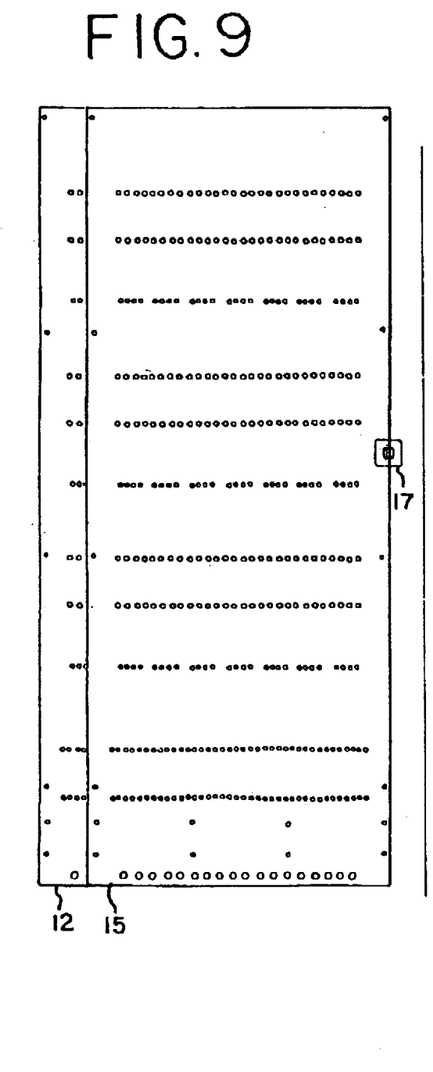
FIG. 9 is an elevation of another embodiment of a supply panel with an adjusting sheet metal piece for varying the total opening area of the panel.

The description so far has focused on proofing cabinets having supply panels with openings of fixed dimensions. It may be useful to have supply panels in which the total opening area for the airflow may be adjusted. FIG. 9 depicts an embodiment in which each supply panel 12 in a proofing chamber has an additional panel 15 with openings for the flow of heated air. This panel may be used to adjust air distribution within the chamber by being translated horizontally as little as one or two inches (two to five cm) to align or block openings in the panels and thus adjust the flow of air. Aligning the openings will allow more airflow (more CFM, cubic feet per minute), and thus more heat transfer; blocking or partially blocking openings will allow less air, lowering the CFM and the heat transfer. Increased CFM is associated with increased heat transfer and increased proofing rate. This adjusting panel may be adjusted manually, such as by moving the panels in a track and securing with fasteners, such as bolts and wing nuts. Alternatively, the adjusting panel may be translated by a motor and gear train 17. There may be an adjusting panel on each side of the proofing cabinet for symmetrical adjustment of the air flow within the chamber and the cabinet.

Figure 10:
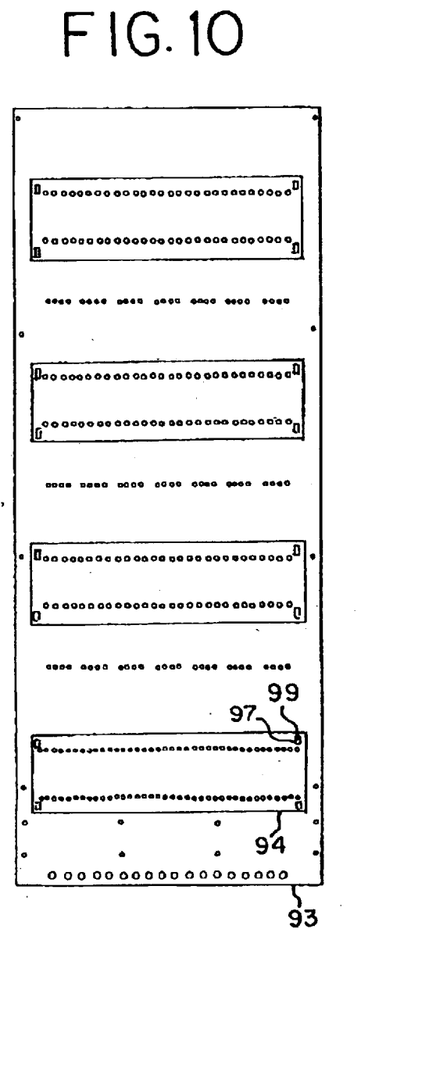
FIG. 10 is an elevation of another embodiment of a supply panel with several adjusting sheet metal pieces for varying the total opening area of the panel.

In other embodiments, there may be multiple adjusting panels, one for each side of each proofing zone. The flow of air to each proofing zone may then be adjusted by translating the panel for that zone to align or block openings. In an embodiment having multiple zones, the adjusting panels may be adjusted vertically, translating up or down an inch or two (two to five cm) to align or block openings. The panels could instead move horizontally to adjust the total opening area FIG. 10 depicts an elevation view of such an embodiment. Supply panel 93 has a plurality of openings and is equipped with an adjusting panel 94 for each proofing zone. Adjusting panels 94 include vertical slots 97 for vertical movement. Adjusting panels 94 are then secured manually to supply panel 93 with bolts 99 and nuts, such as wingnuts. Adjusting panels 94 have a plurality of openings used to align or partially align, block, or partially block the openings in supply panel 93. In this manner, the total opening area of each proofing zone may be individually adjusted by varying the vertical position of the appropriate adjusting panel 94. Aligning openings in an adjusting panel will allow more air flow through that panel, allowing more heat transfer and tending to raise the proofing rate in the proofing zone that corresponds to that panel, while allowing less air for routing to the remaining proofing zones and thus lowering the heat transfer and the proofing rates in those zones. Blocking or partially blocking openings in an adjusting panel will allow for less air to flow through that panel and will tend to lower the proofing rate in the proofing zone that corresponds to that panel, while tending to increase the air flow and to raise the proofing rate in the remaining zones. 22 ga sheet metal, such as stainless steel or aluminum, may be used for panels 93, 94. An adjusting panel or panels in the form of a circular disc with openings or holes in a pattern can also be used to achieve the same results.

There are many ways to practice the invention. It is most convenient to manufacture panels by using circular openings or holes, which may be readily drilled or punched. Openings or holes of other shapes may also be used, such as diamond shape, square shape, an elongated rectangular shape, an elliptical shape, and so on. Any shape that is convenient to manufacture and is conducive to producing uniform temperatures within the proofing cabinet is meant to be included. The chambers described above are meant to have a relatively narrower dimension in the left-to-right direction, allowing for closer control and greater temperature uniformity. However, proofing cabinets may also be made which are larger in the left-to-right direction, allowing for greater capacity in the proofing cabinet, so long as the desired degree of temperature uniformity is achieved.

The proofing cabinets are intended primarily for proofing of dough or other bread products, with a temperature range of about 95° F. to about 120° F. (about 35° C. to about 49° C.). However, holding cabinets for holding prepared foods at somewhat higher temperatures may also be made using these inventive concepts. Such cabinets would preferably be able to hold food at temperatures up to about 170° F. (77° C.). It is convenient to manufacture proofing cabinets in which the air flow is directed from the top to the sides to a central proofing chamber, and then back to the top. There may be other embodiments in which the air is also routed through a supply duct and a supply panel at the rear of the chamber, and thence to the central proofing chamber. This would be a more expensive configuration, but would work well and is within the scope of the invention.

Accordingly, it is the intention of the applicants to protect all variations and modifications of the present invention. It is intended that the invention be defined by the following claims, including all equivalents. While the invention has been described with reference to particular embodiments, those of skill in the art will recognize modifications of structure, materials, procedure and the like that will fall within the scope of the invention and the following claims. For instance, while the openings have been described as being in rows, many other patterns of openings will work as well. However, rows are convenient to depict in drawings and to program for sheet metal punching machines, and the invention is easier to describe and visualize in such terms. Rather than rows of openings, many other variegated patterns of openings will also work, so long as the heated air is well-distributed to all parts of the proofing zone or proofing zones.

It is therefore intended that the foregoing detailed description be regarded as illustrative rather than limiting, and that it be understood that it is the following claims, including all equivalents, that are intended to define the spirit and scope of this invention.

What is claimed is:

1. An insulated proofing cabinet comprising:
   (a) a proofing chamber having at least top and bottom proofing zones, each proofing zone comprising a horizontally defined region;
   (b) an air supply panel on at least two sides of the chamber having openings and a total opening area for each of the proofing zones for distributing air from an air supply duct on both sides of the chamber simultaneously to each of the at least top and bottom proofing zones; and
   (c) a fan and a heater receiving air from the proofing chamber and heating and recycling the air through the supply duct and the supply panels, wherein the total opening area varies between the at least top and bottom proofing zones so that each of the at least top and bottom proofing zones may be maintained at substantially the same temperature during operation.

2. The apparatus of claim 1 wherein the total opening area for each proofing zone is defined by a number and size of openings in each of the air supply panels adjacent that proofing zone.

3. The apparatus of claim 1 wherein each proofing zone receives heated air from at least two rows of openings in each of the supply panels.

4. The apparatus of claim 1 wherein the fan and the heater are located atop the proofing chamber and the supply panel has a greater total opening area supplying the bottom proofing zone than the total opening area supplying the top proofing zone.

5. The apparatus of claim 1 further comprising a return air separator atop the proofing chamber.

6. The apparatus of claim 1 wherein insulation is on outer sides of the air supply duct and further comprising an outer sheet metal skin over the insulation.

7. The apparatus of claim 1 wherein the heater is capable of heating the proofing chamber to temperatures in the range from about 90° F. (32° C.) to about 120° F. (49° C.).

8. The apparatus of claim 1 wherein the temperature in the top proofing zone may be maintained during normal operation within 5° F. (3° C.) of the temperature in the bottom proofing zone.

9. The apparatus of claim 1 wherein the heater comprises a calrod heating element fashioned in a circular shape.

10. The apparatus of claim 1 further comprising at least one temperature sensing device and a controller in communication with the fan and heater.

11. The apparatus of claim 1 further comprising a roll-in ramp at floor level at a front of the proofing cabinet.

12. The apparatus of claim 1 comprising two proofing chambers adjacent one another.

13. The apparatus of claim 12 further comprising at least one controller capable of controlling the two proofing chambers at the same temperature.

14. The apparatus of claim 12 further comprising at least one controller capable of controlling the two proofing chambers at different temperatures.

15. The apparatus of claim 1 wherein the openings are selected from the group consisting of a round shape, an elongated shape, an elliptical shape, a diamond shape, a rectangular shape, and a square shape.

16. The apparatus of claim 1 further comprising an adjusting panel adjacent to at least one of the at least two supply panels for adjusting the total opening area supplying at least one of the proofing zones.

17. The apparatus of claim 1 wherein the total opening area for each panel supplying a given proofing zone is substantially the same.

18. The apparatus of claim 1 wherein the proofing chamber has four proofing zones and the temperatures in the proofing zones may be maintained during normal operation at temperatures that are within 5° F. (3° C.) of each other.

19. A method of configuring a proofing cabinet, the method comprising:
   (a) heating air and blowing air to a supply duct and a supply panel with openings on at least two sides of a proofing chamber;
   (b) dividing a flow of the air into at least a top and a bottom proofing zone by forcing the air through openings in the supply panel, wherein a total opening area supplying said air to said top and bottom proofing zones differs between top and bottom proofing zones;
   (c) measuring a temperature in each of the at least top and bottom proofing zones; and
   (d) adjusting the total opening area until the temperature is substantially the same in each of the at least top and bottom proofing zones.

20. The method of claim 19 wherein the adjusting is carried out until the temperatures in each of the at least top and bottom proofing zones are within 5° F. (3° C.) of each other.

21. The method of claim 19 wherein the total opening area is adjusted by varying one or both of a number and a size of the openings.

22. The method of claim 19 wherein the total opening area is adjusted by translating at least one adjusting panel adjacent to at least one of the supply panels.

23. The method of claim 19 wherein the proofing cabinet is divided into four zones.

24. The method of claim 19 wherein the temperatures are measured by using at least two temperature sensing devices in each of the at least top and bottom proofing zones.

25. A method of proofing a product, the method comprising:
   (a) placing the product into a proofing cabinet according to claim 1;
   (b) setting a desired temperature for the cabinet; and
   (c) waiting for a period of time while the product is at the temperature.

26. The method of claim 25 further comprising evaluating the product.

27. The method of claim 26 wherein the step of evaluating is accomplished with predetermined standards for evaluating the product.

28. The method of claim 26 wherein the product rises and wherein evaluating is conducted by determining whether the product has risen the proper amount.

29. The method of claim 25 wherein the cabinet has four proofing zones, and wherein the step of placing the product comprises placing vertically stacked pans of pizza dough into each proofing zone.

30. The method of claim 25 wherein the temperatures are each within 5° F. (3° C.) of each other in each of the proofing zones.

31. The method of claim 25 wherein the item is selected from the group consisting of dough, a bread product, a yogurt, a pharmaceutical product, and a biological culture.

32. The method of claim 25 further comprising controlling a temperature of the proofing chamber with a controller in communication with at least one temperature sensing device within the cabinet.

33. An insulated proofing cabinet comprising:
   (a) a proofing chamber;
   (b) an air supply panel on at least two sides of the chamber having openings for distributing air from an air supply duct on both sides of the chamber simultaneously; and
   (c) a fan and a heater receiving air from the proofing chamber and heating and recycling the air through the supply duct and the supply panel, wherein the openings are sized and placed so that a temperature of the chamber may be maintained within 5° F. (3° C.) throughout the chamber.

34. The apparatus of claim 33 wherein the heater is capable of heating the proofing chamber to temperatures in the range from about 90° F. (32° C.) to about 120° F. (49° C.).

35. The apparatus of claim 33 further comprising at least one temperature sensing device and a controller in communication with the fan and heater.

36. The apparatus of claim 33 further comprising a roll-in ramp at floor level at a front of the proofing cabinet.

37. A proofing cabinet, comprising:
   (a) a proofing chamber having two sides, a front, a back, a top and a bottom, and four proofing zones within the chamber, the proofing cabinet being insulated on the two sides, the front, the back, the top, and the bottom;
   (b) an air supply panel and an air supply duct on each of the two sides of the chamber, the panels having openings for distributing air from the air supply ducts to both sides of the chamber simultaneously, to each of the four proofing zones;
   (c) a heater; and
   (d) a fan receiving air from the proofing chamber and passing the air over the heater to heat and recycle the air through the supply ducts and the supply panels, wherein the openings are sized and placed so that all of the four proofing zones may be maintained at temperatures that are within 5° F. (3° C.) of each other.

38. The apparatus of claim 37 wherein the proofing cabinet is capable of maintaining a temperature of from about 95° F. (35° C.) to about 170° F. (77° C.).

39. The apparatus of claim 37 wherein the heater comprises a circular calrod heating element.

40. The apparatus of claim 37 further comprising at least one adjusting panel adjacent at least one air supply panel.

41. An insulated proofing cabinet comprising:
   (a) a proofing chamber having at least top and bottom proofing zones, each proofing zone comprising a horizontally defined region;
   (b) an air supply panel on at least two sides of the chamber having openings and a total opening area for each of the proofing zones for distributing air from an air supply duct to each of the at least top and bottom proofing zones;
   (c) an adjusting panel adjacent to at least one of the supply panels; and
   (d) a fan and a heater receiving air from the proofing chamber and heating and recycling the air through the supply duct and the supply panels, wherein the total opening area varies between the at least top and bottom proofing zones so that each of the at least top and bottom proofing zones may be maintained at substantially the same temperature during operation.

42. A proofing cabinet, comprising:
(a) a proofing chamber having two sides, a front, a back, a top and a bottom, and four proofing zones within the chamber, the proofing cabinet being insulated on the two sides, the front, the back, the top, and the bottom;
(b) an air supply panel and an air supply duct on each of the two sides of the chamber, the panels having openings for distributing air from the air supply ducts to each of the four proofing zones,
(c) at least one adjusting panel adjacent one of the air supply panels;
(d) a heater; and
(e) a fan receiving air from the proofing chamber and passing the air over the heater to heat and recycle the air through the supply ducts and the supply panels, wherein the openings are sized and placed so that all of the four proofing zones may be maintained at temperatures that are within 5° F. (3° C.) of each other.

* * * * *